UNITED STATES PATENT OFFICE.

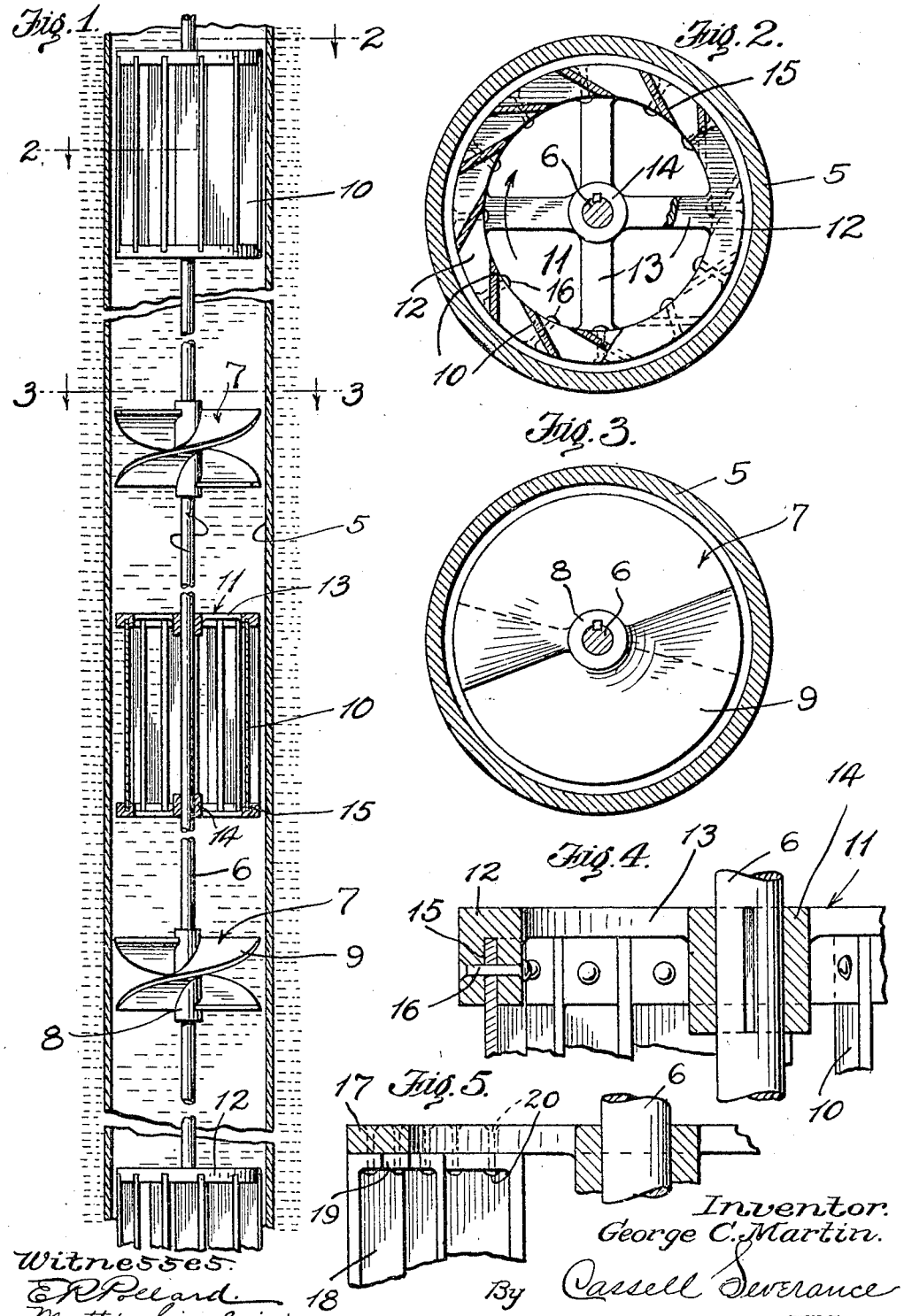

GEORGE C. MARTIN, OF LOS ANGELES, CALIFORNIA, ASSIGNOR TO GEORGE E. KELLAR, OF LOS ANGELES, CALIFORNIA.

BEARING FOR PUMP-SHAFTS.

1,292,626.

Specification of Letters Patent.  Patented Jan. 28, 1919.

Application filed March 4, 1915. Serial No. 12,205.

*To all whom it may concern:*

Be it known that I, GEORGE C. MARTIN, a citizen of the United States, residing at Los Angeles, in the county of Los Angeles and State of California, have invented certain new and useful Improvements in Bearings for Pump-Shafts, of which the following is a specification.

This invention relates to improvements in pump mechanisms, and particularly to bearings for pump shafts, where shafting rotates within a pump barrel or tube, the materials or liquids pumped being so acted upon as to center and revolubly support the said shafting.

It is an object of the invention to provide a hydraulic bearing for pump shafting in which the impact of liquids pumped against the pump casing or tube may be utilized to revolubly support the said shafting within said casing or tube.

It is also an object of the invention to provide a pump shaft with one or more bearing members arranged to force the material pumped against the inner surface of the pump tube with sufficient force and in the proper direction to center the said shaft and bearing members within said tube.

It is a further object of the invention to provide a hydraulic bearing for a shaft within a liquid containing tube which is provided with means for forcing the liquids in the tube outwardly against the inner surface thereof, said means being supported upon and actuated by the said shaft.

It is a still further object of the invention to provide a pump mechanism comprising a pump barrel or tube adapted to be placed in water to be pumped, a shaft operating therein and having water impellers secured thereon, and bearing members having inclined members or paddles adapted to force some of the water against the inner surface of the said tube at intervals, the impact of the water against the tube operating to center the shaft with respect thereto and afford a frictionless bearing therefor.

In the accompanying drawing forming a part of this specification:

Figure 1 is a longitudinal central sectional view through a portion of a pump mechanism, the shaft, impellers and some of the bearing members being shown in elevation, while one of said bearing members is shown in longitudinal section.

Fig. 2 is a transverse sectional view taken upon the line 2—2 of Fig. 1.

Fig. 3 is a transverse sectional view of the pump mechanism taken upon the line of 3—3 of Fig. 1.

Fig. 4 is an enlarged fragmentary detail sectional view taken through a portion of one end of a bearing member.

Fig. 5 is a similar fragmentary sectional view showing a modified form of the bearing member.

The device of the present invention is intended to afford a simple and effective means for supplying a frictionless bearing and centering means for pump shafting, the said means being constructed to force some of the liquid or water pumped through the casing or tube of a pump mechanism, outwardly against said casing or tube, so that the impact thereof will hold the bearing member or members and the shafting revolubly in place. The details and features of the invention will now be more specifically described, reference being had to the accompanying drawing, in which 5 indicates the tube, barrel or casing of a pump, 6 a pump shaft extending longitudinally through said tube, and 7 impellers secured upon the shaft and adapted to move or lift water, liquids or other materials in the tube 5.

The tube 5 may be of any desired diameter and length, and is adapted to be inserted in any body of material to be acted upon, such a tube being usually inserted in a body of water, as in a well, reservoir, sump or any place from which it is desired to lift or move the water. The said tube may therefore be held or supported in place in any desired manner, the means therefor not being shown. The shaft 6 may be supported as to longitudinal movement in any desired manner not shown, and may be rotated by any suitable mechanism also not shown, these features forming no part of the present invention.

The impellers 7, of which there are usually a plurality, secured to the shaft at intervals, are usually provided with a hub portion 8 engaging the shaft, and with one or more spiral flights or blades 9, the whole forming a screw like propeller means adapted to force water or other materials through the tube 5. The said flights or blades 9 have a circumference approaching somewhat closely the inner surface of the tube 5, but not coming near enough to touch the same, whereby substantially the whole column of water will be impelled when the shaft is turned.

The bearing members for the shafting forms an important part of the device and one or more of such devices are applied to the shaft at suitable points for centering the shaft within the tube 5 and supporting the same revolubly in position in a substantially frictionless manner. As shown in the drawing each bearing member is formed with a series of blades or paddles 10 arranged usually in equi-distant positions with respect to each other around the shaft and set obliquely with respect to the tube walls, as clearly shown in Fig. 2 of the drawing. The said blades may be supported with respect to the shaft in any desired manner, a simple way being illustrated in the drawing and comprising skeleton or spider heads 11 having outer ring portions 12 and arms 13 connecting the same with a hub 14, keyed or otherwise rigidly fastened on the shaft 6. The inner faces of the ring portions 12 are provided with obliquely arranged kerfs or recesses 15 adapted to receive the ends of the blades 10. The ends of said blades are secured in position in said kerfs by means of rivets or bolts 16 passed through the ring portions and the ends of the blades as clearly shown in Figs. 2 and 4. The said blades 10 are thus held in approximately tangential relation to the inner peripheral surfaces of the said ring portion 12, so that when the shaft is rotated in the direction of the arrow in Fig. 2, the blades will force portions of the water being pumped outwardly against the inner surface of the tube 5. The impact of a series of sheets or jets of water forced outwardly in this manner at suitable points around the bearing member operates to properly center the bearing members within the tube 5 without the said members engaging the tube at any point, whereby a hydraulic bearing is secured for the shaft.

The details of construction may be considerably varied without departing in the least from the spirit of the invention. Thus as shown in Fig. 5 thin spider plates 17 may be employed at the ends of the blades in forming the bearing members. In this instance the ends of the blades 18 are provided with securing flanges 19 which are bolted or riveted as at 20 to the peripheral portions of the spiders. It will be evident that other equivalent means may be employed for holding inclined or approximately tangential pieces or surfaces with respect to the shaft, and near enough to the tube or casing to secure proper bearing support by the impact of the water driven against said casing by said pieces or surfaces when the shaft is rotated.

What is claimed is:

1. In a device of the character described, a casing, a shaft concentrically supported within said casing, an impeller element attached to said shaft, and a plurality of flat surfaces rotatable with said shaft and tangentially disposed relative to the axis thereof.

2. In a device of the character described, a casing, a shaft rotatably mounted in said casing, said shaft having impeller blades mounted thereon, and a plurality of flat surfaces disposed around and tangential relative to the axis of said shaft, said flat surfaces being spaced apart and openings being formed therebetween, whereby a liquid moved into contact with said surfaces by said impeller may be discharged over said surfaces and against the inner periphery of said casing.

3. A pump mechanism having a tube through which materials are forced, a pump shaft carrying material impelling means and bearing members having oblique surfaces adapted to force some of the materials pumped against the tube, for movably supporting the shaft in the tube.

4. A pump mechanism comprising a pump tube, a shaft arranged longitudinally within the same, impellers carried by said shaft and bearing members for said shaft having tangential faces adapted to force a portion of the materials in the said tube outwardly for offering a centering support to the shaft.

5. A rotary bearing member for rotary pump shafts having oblique faces rigidly connected to the shaft and adapted to force water outwardly within the pump whereby the bearing is movably supported within the pump.

6. A floating bearing for pump shafts having blades fixed at intervals outside the shaft and extending longitudinally with respect thereto, means for holding the blades with respect to the shaft, the blades forcing water within the pump against the walls thereof for revolubly supporting the shaft in a substantially frictionless manner and means for raising said water.

7. A floating bearing for pump shafts comprising a series of tangentially arranged blades spaced about the shaft and heads adapted to allow water to pass said bearing secured to the shaft and having the ends of the blades fastened thereto.

8. In a pump mechanism the combination with a pump tube and a pump shaft having impellers thereon, of bearing members having spider supports engaging said shaft and obliquely set blades secured to said spider supports whereby the shaft will be centered in the tube by the impact of water driven by the blades against said tube.

9. In a pump mechanism the combination with a pump casing and a rotary shaft mounted therein, liquid impellers carried by the shaft and rotary bearing members having spiders secured to the shaft and formed with kerfs upon their inner peripheral faces, blades having their ends engaging said kerfs and means for securing the said blades in the kerfs, the said blades acting to force jets of water against the casing when the shaft is rotating for affording a water bearing for the shaft.

In testimony whereof, I have hereunto set my hand, in presence of two witnesses.

GEO. C. MARTIN.

Witnesses:
CASSELL SEVERANCE,
EARLE R. POLLARD.

Copies of this patent may be obtained for five cents each, by addressing the "Commissioner of Patents, Washington, D. C."